United States Patent [19]
Martin, Jr.

[11] 3,934,250
[45] Jan. 20, 1976

[54] HELICOPTER BLIND LANDING AND HOVER SYSTEM

[75] Inventor: Oscar M. Martin, Jr., Bethesda, Md.

[73] Assignee: The United States of America as represented by the Secretary of the Navy, Washington, D.C.

[22] Filed: June 7, 1974

[21] Appl. No.: 477,374

[52] U.S. Cl............. 343/6 ND; 343/6 TV; 343/7.4
[51] Int. Cl.² ......................................... G01S 9/56
[58] Field of Search ............... 343/6 ND, 6 TV, 7.4

[56] References Cited
UNITED STATES PATENTS

| | | | |
|---|---|---|---|
| 3,076,961 | 2/1963 | Bibbero | 343/6 ND |
| 3,243,805 | 3/1966 | Smith | 343/7.4 |
| 3,798,795 | 3/1974 | Michelsen | 343/6 TV X |

Primary Examiner—T. H. Tubbesing

[57] ABSTRACT

A precision hover and landing system for use in a helicopter is provided. A television camera system, an infra-red scanner and a passive radar antenna array are located on a three-axis gimbal mounted on the helicopter. An airborne radar angle tracking receiver and a ground-based transponder provide azimuth and elevation angle error signals for pointing the gimbal along the true line-of-sight to the desired landing area. A ranger unit provides range and range rate of change information.

12 Claims, 5 Drawing Figures

HELICOPTER BLIND LANDING AND HOVER SYSTEM

BACKGROUND OF THE INVENTION

The extensive military use of helicopters in adverse environments has pointed up some major deficiencies in helicopter hover and landing systems. The problem basically being to locate the desired landing area and to hover directly above it prior to landing. Conventional altimeters generally provide accurate information as to altitude, but it is difficult, due to poor environmental conditions, to obtain good line-of-sight angle information relative to the intended landing spot. Moreover, autopilots and instrument landing systems designed for fixed-wing aircraft are not, in general, adaptable for helicopter use. This is because these systems use a glide-slope technique which is not compatible with helicopter hover and landing requirements. Simply visually pointing a radar antenna at the landing area is also a problem in situations such as night landings in hostile territory, and landings on fog-bound ships or in heavy smoke. Furthermore, even when a completely automatic hover and landing system has been produced, there has been a marked reluctance on the part of the helicopter pilots to "fly blind." Hence, it may be seen that a need exists for a helicopter hover and landing system which provides pilot information and steering signals and which is not based on the glide slope concept, and which also offers some visual information about the landing area to increase pilot confidence.

SUMMARY OF THE INVENTION

The subject invention provides apparatus intended as part of a precision hover and landing system for use in aircraft capable of making vertical landings, such as rotary wing aircraft, or helicopters. This invention comprises a precision airborne tracking system and a ground based transponder, with all sensing units employed by the airborne tracker mounted on a single three-axis gimbal. The airborne system utilizes as one sensing mode a passive radar receiver which locates a radiating target, i.e., the ground based transponder. Multiple display devices located in the helicopter cockpit serve to indicate to the pilot the desired target, and its annular position relative to the aircraft. In operation, the pilot or operator first positions the gimbal, or the entire aircraft if necessary, so that the transponder will be in the forward hemisphere of the airborne tracking system. Radio interrogation signals from the aircraft's interrogator will now be identified by the transponder which will then transmit, on a pulse-by-pulse basis, a train of pulses which are used by the tracking system to automatically point the sensors along the line of sight to the transponder.

A low light level television camera system is also mounted on the same gimbal and is collimated with the passive radar antenna array. This system incorporates two television cameras; a wide angle camera having a field of view of 3° to 10°, and a narrow angle camera having a field of view of approximately 1°. This television capability also serves to greatly increase pilot confidence by affording a visual representation of the landing and hover area.

The airborne tracking receiver utilizes an interferometric antenna array which is also mounted on the gimbal. This array consists of five dipole antenna elements, arranged to provide coarse and fine track element pairs in order to insure unambiguous acquisition and tracking of the ground based transponder. Azimuth and elevation angle error signals are obtained by making a phase comparison of the signals received by a selected pair of antenna elements. Angle acquisition logic circuitry is provided to process the angle errors in such a way as to provide signal pull-in from approximately plus-or-minus 80°. The pulsed signals received in the aircraft are detected by an angle tracking receiver, then processed in a pulse repetition frequency (PRF) gate unit. A ranger unit and an interrogator unit obtain pulse timing information from the PRF gate unit. The angle tracking receiver employs an automatic radio frequency control loop to allow signal pull-in over a plus-or-minus 10 megahertz range. The invention provides a time-sharing arrangement in the angle tracking receiver which allows use of only one pair of intermediate frequency (IF) channels to process both azimuth and elevation angle signals. Since these two IF channels are not necessarily identical, the angle tracking receiver performs channel switching on a pulse-to-pulse basis to interchange or transpose the signal paths through the pair of IF channels. This interchanging removes any biasing effects caused by the use of the nonidentical IF channels. The angle error signals are processed through sample and hold filter channels to convert them to direct current voltage for use by the gimbal servo system. The interrogator unit transmits pulses to the ground based transponder at a frequency selected by the PRF gate unit. A pre-set delay is incorporated in the transponder so that the system will operate to zero range. The ranger unit serves to measure the time interval between the transmitted and received pulses in order to obtain a signal representing the range between the aircraft and the transponder. This signal is differentiated to obtain a rate of change of the range value. The operating range is selected by the pilot from a variety of possible range settings. A display panel containing indicator status lights, range and angle readout meters, and the infra-red and television screen is provided in the helicopter cockpit for pilot information.

The gimbal upon which the various sensing units are mounted is capable of pointing over a large yaw (azimuth) angle with the freedom of the pitch (elevation) axis allowing a variation of from plus 20° to minus 135° (+ 20° to − 135°).

It is therefore an object of the present invention to provide airborne and ground-based apparatus for producing signals to be utilized in hovering and landing a helicopter.

It is another object of the present invention to provide airborne and ground-based apparatus for use aboard a helicopter for visually observing a landing area and providing direction signals and range signals.

It is a further object of the invention to provide an airborne helicopter hover and landing system which provides a pilot with a visual reproduction of a landing area, an infra-red reproduction of a landing area, range and range rate of change to the landing area, and elevation and azimuth angle information regarding the landing area.

It is another object of the present invention to provide an unambiguous angle pointing system by simultaneously measuring the angle with two sets of microwave interferometer antennas in each plane of measurement.

It is another object of the present invention to provide apparatus producing signals to be used in an automatic helicopter landing system comprising a television camera system, an infra-red scanner system and a passive radar system communicating with a ground-based transponder.

It is still a further object of the present invention to provide a helicopter hover and landing system wherein all sensing instruments of the system are mounted on a single three-axis gimbal.

DESCRIPTION OF THE PREFERRED EMBODIMENT

Figure 1:
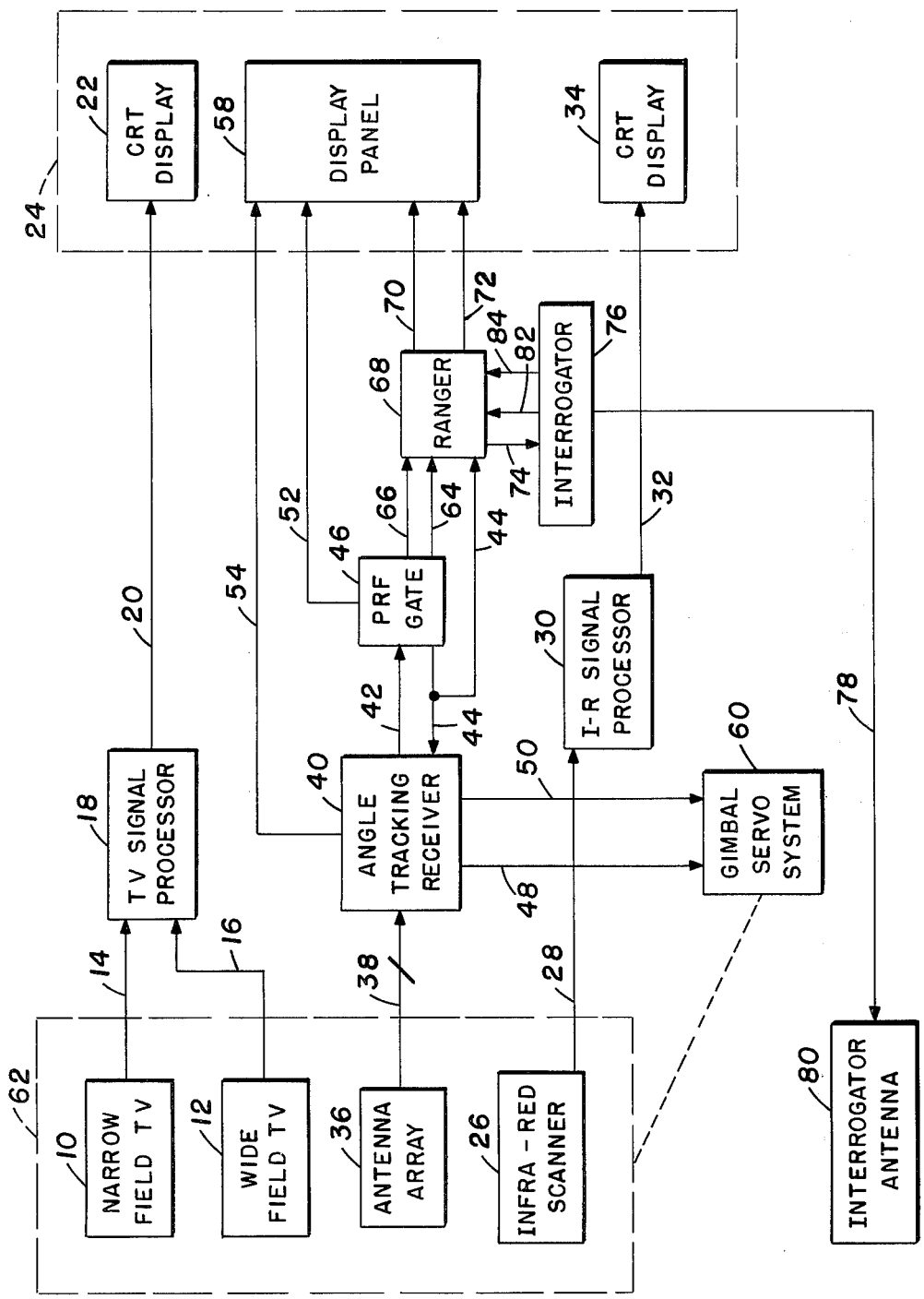
FIG. 1 shows the preferred embodiment of the airborne equipment of the invention in block diagram form.

Referring now to FIG. 1 which shows the precision hover and landing system of the present invention in block diagram form, a closed-circuit television system is provided which utilizes a narrow-angle lens with a conventional miniature television camera 10 and a wide-angle lens with a second miniature camera 12. Both cameras produce conventional television signals. These signals, on lines 14 and 16, are fed to a conventional closed-circuit television signal processor 18, which produces a signal on line 20 for display on a standard cathode ray tube (CRT) television picture tube 22. The display 22 is located in the helicopter cockpit, which is shown generally by the broken line at 24. The camera systems 10 and 12, the signal processor 18, and the CRT display 22 all function together in the same way as a conventional closed circuit television monitor system. This monitor-like system is designed to operate at the lowest possible ambient light levels. A second visual display is provided by an infra-red scanner 26, which functions as a camera sensitive only to radiation in the nonvisible, infra-red range of the electro-magnetic spectrum. The infra-red scanner 26 produces a signal which is fed on line 28 to a signal processor 30, much like the conventional television signal processor 18. The infra-red signal processor 30 amplifies the signal on line 28 and processes it such that it may be displayed on a conventional visual display device. The processed signal is fed on line 32 to a cathode ray tube 34 which is also located in the helicopter cockpit 24. Once again, the infra-red scanner 26, the infra-red signal processor 30, and the cathode ray tube display 34 function together as a closed-circuit system, but sensitive only to the non-visible infra-red portion of the spectrum.

Figure 4:
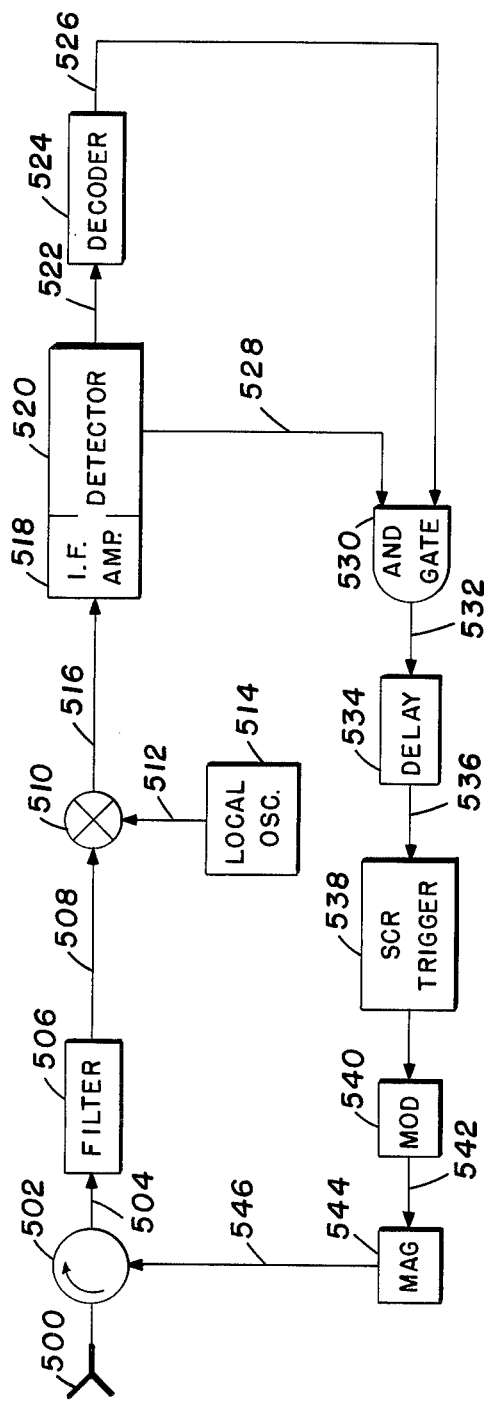
FIG. 4 shows the ground-based transponder of the preferred embodiment in block diagram form.

Signals produced by the ground-based transponder system, shown in detail in FIG. 4, are received by an antenna array 36 and fed on multiple lines 38 to an angle tracking receiver 40. The angle tracking receiver 40 is connected by lines 42 and 44 to a pulse repetition frequency (PRF) gate unit 46. The receiver 40 and the PRF gate unit 46 operate together to produce elevation and azimuth error signals on lines 48 and 50, and also pilot information signals on lines 52 and 54. The pilot information signals on lines 52 and 54 are fed to a display panel 58 located in the cockpit 24. The elevation and azimuth signals on lines 48 and 50 are fed to a servo motor system 60 which is mechanically linked to the three-axis gimbal, shown by the dashed line 62. The PRF gate unit 46 provides timing and pulse coincidence signals on lines 64 and 66 to a ranger unit 68, which processes these signals to provide range and range rate signals on lines 70 and 72. A triggering signal produced by the PRF gate 46 which is fed to the angle tracking receiver 40 is also fed on line 44 to the ranger unit 68. Lines 70 and 72 are connected to the display panel 58 and may be displayed digitally or with conventional meters or the like. The PRF gate unit 46 and the ranger 68 also cooperate to produce an interrogate signal on line 74 which is fed to an interrogator unit 76. The interrogator unit 76 produces a signal which is fed by line 78 to an interrogator antenna 80 mounted on the helicopter. The interrogator 76 produces the high-power pulsed signal which is received by the ground based transponder for producing the response signal received by the antenna array 36 mounted on the three-axis gimbal 62. The pulsed signals produced by the interrogator 76 are monitored and fed back, on lines 82 and 84, to the ranger 68 so that proper system timing will be maintained.

Figure 3:
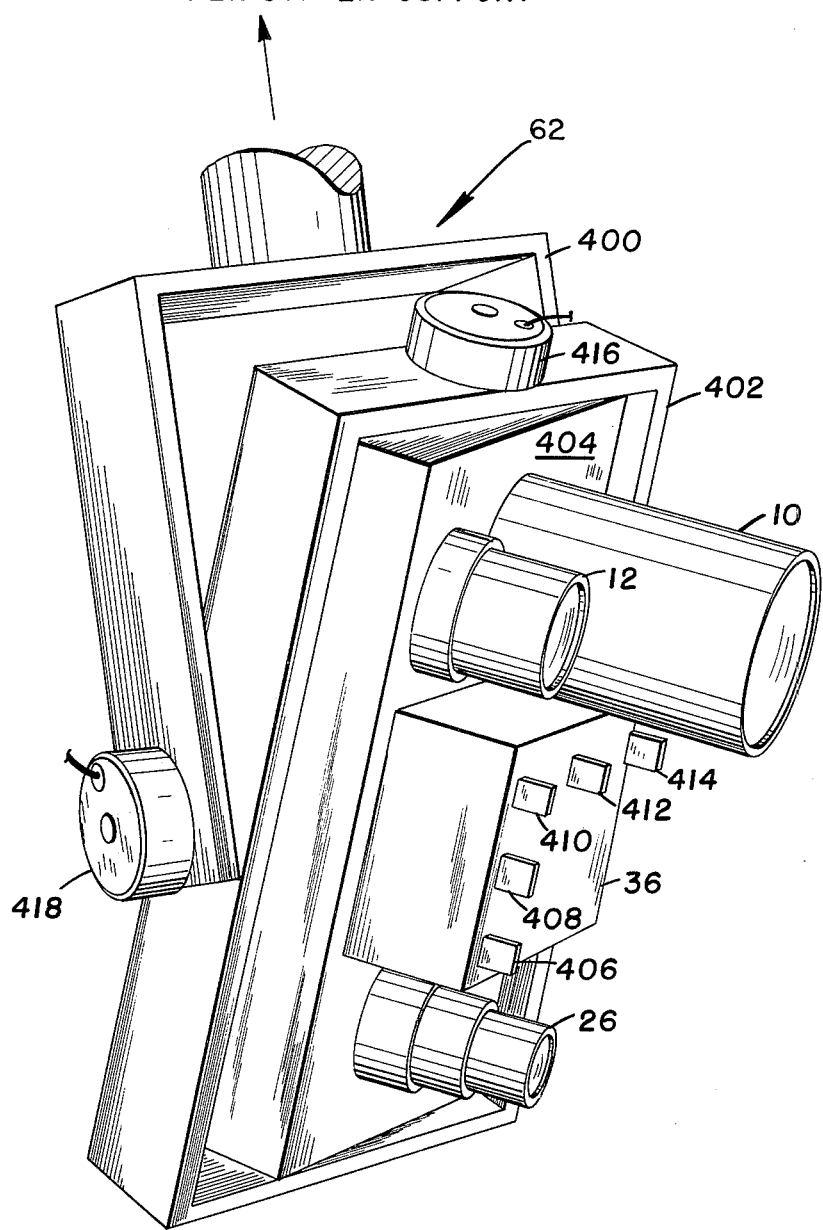
FIG. 3 is a perspective view of a three-axis gimbal used in the preferred embodiment of the invention.

The television cameras 10 and 12, the infra-red scanner 26 and the antenna array 36 are all firmly mounted on the same platform of the three-axis gimbal, shown at 62; this gimbal and the mounting arrangement will be shown in more detail in FIG. 3. Slewing of the gimbal 62 is controlled by the servo system 60 which operates in response to error signals on lines 48 and 50 produced by the angle tracking receiver 40. The angle tracking receiver 40 operates on signals received by the antenna array 36 which were produced by the ground-based transponder in response to signals produced by the interrogator 76 and transmitted by the interrogator antenna 80. Thus, it can be seen how the system functions as a closed-loop control system for pointing the gimbal 62, and hence the entire helicopter, at the ground based target regardless of visibility. Initial slewing of the gimbal 62 may be provided by the pilot in response to a visual assessment of the target area. The television camera system and infra-red camera system provide the pilot with a confidence building visual representation of the landing and hover area.

Figure 2A:
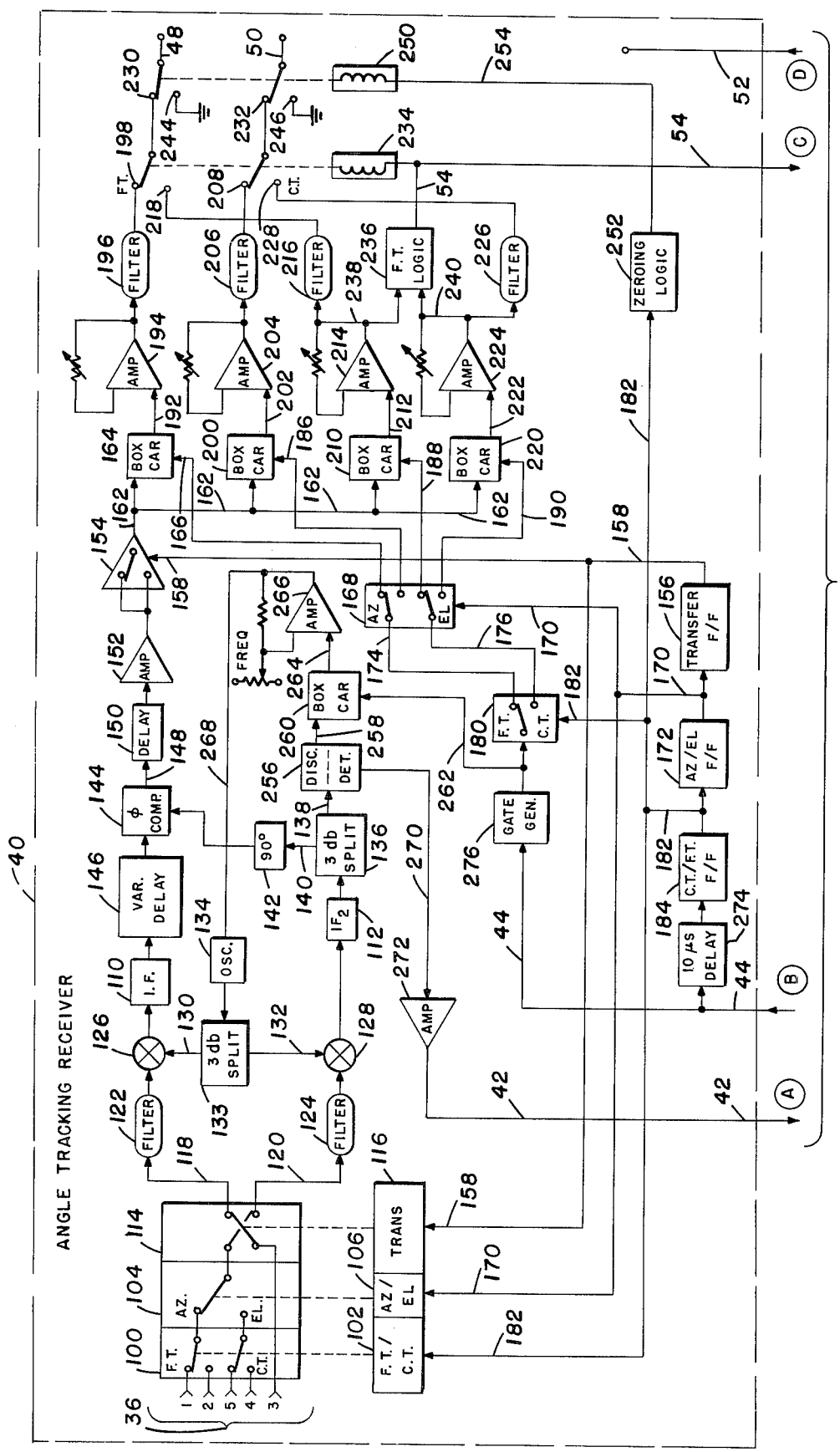
FIGS. 2a and 2b show the airborne equipment of FIG. 1 in schematic form, with FIG. 2a showing the angle tracking receiver and FIG. 2b showing the pulse repetition frequency gate, the ranger and the interrogator subsections of such equipment.
Figure 2B:
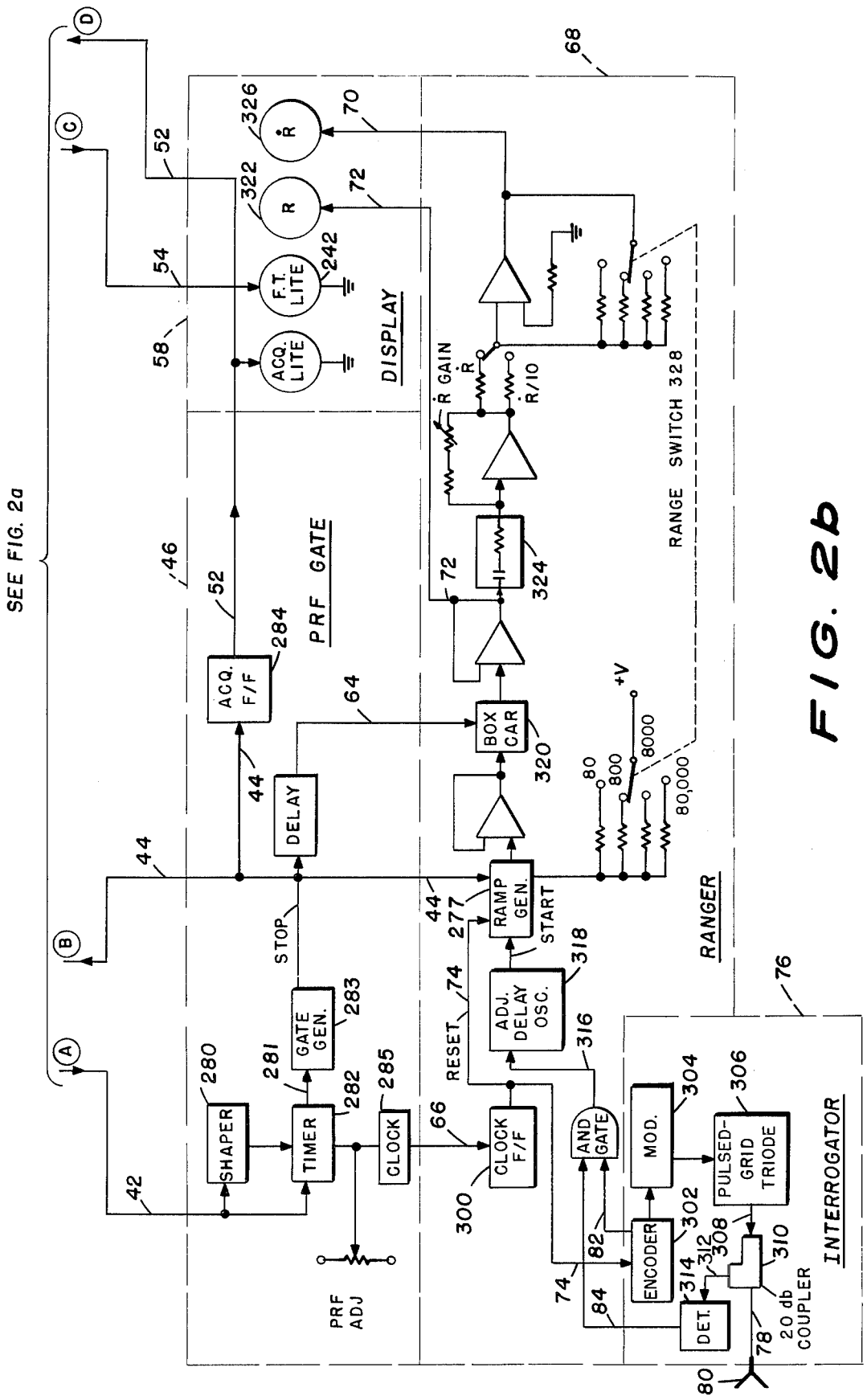

With reference to FIGS. 2a and 2b, the angle tracking receiver 40, the PRF gate 46, the ranger 68, the interrogator 76 and the display panel 58 are shown in more detail than in FIG. 1. Referring specifically to FIG. 2a, signals are received from the transponder by the antenna array 36 mounted on the three-axis gimbal. By selecting certain pairs of dipole elements of the array 36 a course track mode and a fine track mode are provided. To achieve these modes the signals received by the antenna array are switched in a fine/coarse track switch having a switching function section 100 and a switch driver section 102. The antenna array 36 is also arranged such that it can provide both azimuth and elevation information, and to achieve this special function an azimuth/elevation switch having a switching function section 104 and a switch driver section 106 is provided. The operation of these switches will be described in the context of FIGS. 2a and 2b but the specific physical placement of the antenna elements will be shown in the perspective view of FIG. 3. The angle tracking receiver 40 employs only a single pair of intermediate frequency (IF) amplifiers 110 and 112 to process both azimuth and elevation information. Moreover, since the IF channels will not necessarily be identical, and since they are being time-shared for both azimuth and elevation channels, switching on a pulse to pulse basis is provided by a transposing switch, having a switching function section 114 and a switch driver section 116. The received RF signals are fed on lines 118 and 120 from the transposing switching function section 114 to matched radio frequency filters 122, 124 which serve to eliminate noise and other unwanted frequency components. The signals are then mixed down to the IF by two mixers, 126 and 128, with two automatic frequency control (AFC) loop signals on lines 130 and 132 which are obtained by splitting, in a signal splitter 133, the output signal of a voltage-controlled oscillator 134. The mixed signals are then fed to the IF amplifiers 110 and 112, with the output signal from amplifier 112 being split in a signal splitter 136, which produces two equal output signals on lines 138 and 140. The signal on line 140 is shifted by ninety degrees in a phase shifter 142, then fed to a conventional phase comparator 144, where it is phase compared with the signal of the other IF channel which has been delayed by a variable delay line 146. This delay is required to achieve correct system timing. The phase comparator 144 which is being driven by two constant amplitude signals, extracts the angle information in the form of a bi-polar video signal on line 148. This bi-polar video signal is then delayed in a delay line 150 and amplified 152. This delay is chosen to achieve proper sampling of the video pulses by sample and hold devices further on in the circuit. As has already been described, the received signals are transposed back and forth between the two IF channels to remove any biasing effects caused by dissimilar channel configurations. The transposing switching is accomplished by the transposition switch, made up of the switching function section 114 and switch driver section 116, and a switching amplifier 154 which maintains the correct polarity of the signal produced by amplifier 152. This transposition switching is accomplished on a pulse by pulse basis, and is controlled by a transposition flip-flop 156 which produces a signal on line 158. The flip-flop 156 is triggered by a signal derived from the PRF gate subsection 46 as will be described hereinafter. The output signals on line 162, from the switching amplifier 154 will then be converted to direct current (DC) voltages by the use of pulse boxcar filters also referred to as sample and hold devices, then amplified and filtered before being used to drive a servomotor system connected to the gimbal. More specifically, since fine and coarse tracking capabilities are provided for both azimuth and elevation angle error signals, four separate box-car, amplifier, filter channels are required. The bi-polar video signal on line 162 is fed to a first box-car filter 164 which is gated by a signal on line 166. The signal on line 166 is fed from an azimuth/elevation switch 168 which is controlled by a signal on line 170 from an azimuth/elevation flip-flop 172 which has been triggered by a signal produced by the PRF gate subsection 46. The signal produced by the azimuth/elevation flip-flop 172 on line 170 is also used to control the azimuth/elevation driver 106 for controlling the initial switching of the dipole antenna elements 36. The azimuth/elevation switch 168 has two input lines; line 174 having a signal representing the fine track mode, and line 176 having a signal representing the coarse track mode. These two lines, 174 and 176, are fed from a fine track/coarse track switch 180, the state of which is controlled by a signal on line 182 produced by a flip-flop circuit 184, which again is triggered by a timing signal from the PRF gate unit 46. In particular, as shown in FIG. 2a, the flip-flops 184, 172 and 156 are bistable devices and form a timing control chain responsive to the pulse signal received on line 44 from the PRF gate 46 to FIG. 2b. These flip-flops 184, 172 and 156 thus each receive the output from the preceding flip-flop (or the output of the 10 microsecond delay, in the case of the flip-flop 184) and are alternately switched between their two stable states; i,e., one pulse on line 44 switches flip-flop 184 to a first state, the next pulse on line 44 switches the flip-flop 184 to its second state, and the next pulse returns the flip-flop 184 to its first state. Similarly, the flip-flops 172 and 156 are each switched between their two states by the alternate output pulses from the flip-flops 184 and 172 respectively.

The signal on line 182 is also used to control the coarse track/fine track driver 102, which controls the initial switching for selection of the dipole antenna elements 36. The azimuth/elevation switch 168 has four possible lines on which an output signal may be present, and by properly connecting the fine track/coarse track switch 180 and the azimuth/elevation switch 168 these four output lines may be made to represent; fine track/azimuth line 166, fine track/elevation line 186, coarse track/azimuth line 188, coarse track/elevation line 190. These four lines 166, 186, 188 and 190 are then connected to the aforesaid four box-car filter, amplifier, filter channels for gating the bi-polar signal on line 162 through the appropriate channel at the correct time as determined by the PRF gate unit 46.

Accordingly, a first box-car filter 164 then produces a fine track/azimuth signal on line 192 which is fed to a variable gain amplifier 194, filtered in a filter 196, then fed to a first terminal 198 of an output switch. Similarly, a second box-car filter 200 produces a fine track/elevation signal on line 202. This signal is fed to a variable gain amplifier 204, filtered in filter 206 then fed to a third terminal 208 of the output switch. A third box-car filter 210 receives the bi-polar video signal on line 162 and a gating signal on line 188 and produces a coarse track/azimuth signal on line 212. This signal is fed to a variable gain amplifier 214, a filter 216 and then to a second terminal 218 of the output switch. A fourth box-car filter 220 receives the bi-polar video signal on line 162 and a coarse track/elevation gating signal on line 190 and produces the appropriate signal on line 222. This signal is then fed through a variable gain amplifier 224 and a filter 226 to a fourth terminal 228 of the output switch. The four switch terminals 198, 208, 218, and 228 are connected in such a way as to produce two output signals at output terminals 230 and 232, that is, the azimuth and elevation angle error signals at terminals 230 and 232 will represent either fine track or coarse track. These switch terminals are driven by a driver unit 234 which is triggered by a signal on line 54 from a fine track logic unit 236. The fine track logic unit 236 has as its inputs a signal on line 238 produced by the amplifier 214 and a signal on line 240 produced by amplifier 224. The fine track logic unit 236 is comprised of conventional logic circuits and comparators and produces an output signal on line 54 whenever the difference between the coarse track error signals on lines 238 and 240 becomes less than 8 volts. This signal on line 54 is then fed to the driver unit 234 and the switch terminals are selected such that the appropriate error signals are fed to the two output terminals 230 and 232. The fine track logic unit 236 output signal on line 54 is also used to power a fine track indicator lamp 242 located on the display panel 58 in the helicopter cockpit. When the fine track logic unit 236 senses a difference in error voltages in excess of 8 volts the signal on line 54 disappears, the fine track lamp 242 (see FIG. 2b) goes out, and the switch driver 234 goes back to the coarse track position. A zeroing or grounding switch is provided consisting of four input terminals 230, 244, 232, and 246; and two output terminals 48 and 50 with appropriate switch condition being controlled by a driver unit 250. Input terminals 244 and 246 are connected to ground and should the target acquisition signal be lost the error output signals at 48 and 50 will be connected to ground, i.e., zero volts, to prevent an unstable condition. This possible loss of acquisition signal on line 44 from the PRF gate unit 46 is sensed by a zeroing logic unit 252 which is connected to the coarse track/fine track flip-flop 184 by line 182. The zeroing logic unit 252 contains a conventional zero voltage sensing circuit and produces an output signal on line 254 upon the occurrence of loss of acquisition. Error signals to drive the gimbal servo system, 60 of FIG. 1, are now developed and are available on lines 48 and 50.

In order for timing information to be supplied to the PRF gate unit 46 and the subsequent units shown in FIG. 2b, the pulses received by the antenna array 36 must first be detected, amplified, and then fed to the PRF gate unit 46. The received signal on line 138, which was divided in two equal parts by the 3dB splitter 136, is fed to a detector/discriminator unit 256. This unit 256 is comprised of a conventional discriminator and a conventional detector. The discriminator performs its well-known function and measures the variation or offset in frequency from the center or zero reference point, and produces a signal on line 258 indicative of this variation. This discriminator output signal on line 258 is fed to a conventional sample and hold device 260 (box-car filter) which is gated by a timing signal on line 262. The sample and hold device 260 then produces a signal on line 264 which is fed to an amplifier 266. The amplifier 266 output signal on line 268 then represents the amount of frequency shift from a zero reference of the received RF signal. This signal on line 268 is then used to drive the voltage controlled oscillator 134 which produces an output signal to close the AFC loop and lock the receiver 40 onto the frequency produced by the ground based transponder. The detector portion of the combined unit 256 functions as a conventional radio detector and produces a signal on line 270, which represents the detected envelope of the pulsed IF signal. The signal on line 270 is then amplified in amplifier 272 to produce a video signal on line 42 which provides the necessary pulse timing information required by the PRF gate of FIG. 2b. The timing information contained in the video signal on line 42 is processed by the PRF gate and fed back to the angle tracking receiver 40 on line 44 in order to synchronize channel switching and sample and hold filtering. Before the signal on line 44 is fed to the coarse track/fine track flip-flop 184 it is first delayed by a 10 microsecond delay device 274 in order to insure that all switches will be actuated only during the dead time between received pulses. Similarly, before this timing signal on line 44 is used to gate the box-car filter 260 in the AFC loop, it is fed through a gate generator 276, which serves to decrease the pulse width of the signal on line 44 so as to achieve leading edge gating.

Referring now to FIG. 2b, the PRF gate 46, the ranger unit 68, and the interrogator unit 76 of FIG. 1 are shown in more detail and their interaction with the angle tracking receiver 40 of FIG. 2a is also explained in detail. The video pulse on line 42 is first checked for pulse width, to guard against receiver noise, and then passed through the PRF gate 46 to guard against interferring signals, before it is used to stop a ramp generator 277. Pulse width discrimination is performed by a shaper one-shot 280 which is timed to 0.2 microseconds. Noise pulses from the receiver 40 are less than 0.2 microseconds, while the video pulse width on line 42 will exceed 0.2 microseconds, for this reason a timer 282 is triggered by the trailing edge of the shaper 280 pulse only if the video pulse remains longer than 0.2 microseconds. The output signal on line 281 of timer 282 triggers gate generator 283 to stop the ramp generator 277, to set an acquisition flip-flop 284 to ON, and to start sending timing functions on line 44 to the receiver. So long as the transponder or video pulses are being received and appear on line 42, the acquisition flip-flop 284 will be retained in its ON state. On the other hand, if transponder acquisition is lost; e.g., as indicated by a loss of detected pulse signal on line 44 for a preselected interval corresponding to several expected transponder pulses, the flip-flop 284 (a monostable device) will automatically revert to its original or OFF state to indicate to the pilot (acquisition light ACQ extinguished) that transponder acquisition has been lost.

The clock unit 285 located in the PRF gate unit 46 also drives the interrogator subsection 76. The clock output signal on line 66 is fed to a flip-flop 300 which produces a series of trigger pulses on line 74 called an interrogate signal. The interrogate signal on line 74 is fed to an encoder 302, where the pulses are encoded then fed to a modulator 304. The output of the modulator 304 is fed to an output amplifier device 306 such as a pulsed-grid triode or a klystron tube. This high-power radio frequency signal is then fed on line 308 to a 20 dB signal coupler 310 which passes 99 per cent of the signal on line 78 to the radiating interrogator antenna 80. The omnidirectional antenna 80 is not mounted on the three-axis gimbal but is affixed to the bottom of the helicopter airframe. The signal on line 78 which is transmitted by the antenna 80 is the signal required to interrogate the ground based transponder. The second output signal on line 312 from the 20 dB coupler 310 is fed to a conventional detector unit 314 for providing a detected pulse signal on line 84. By producing a detected signal on line 84, in this manner, all internal device time delays are eliminated and a precise reference timing pulse on line 316 is available for use by the ranger unit 68. Thus, the detected pulse signal on line 84 is ANDed with the signal on line 82 (the interrogate signal extracted at encoder 302) to assure that the adjustable delay is properly set and the range measurement begins when the interrogate pulse is radiated. An adjustable delay 318 provides a start pulse to the ramp generator 277, with a delay equivalent to the total "turn around" time of the transponder, which is shown in FIG. 4. The ramp waveform produced by the ramp generator 277 is halted upon arrival of a detected pulse on line 44. The amplitude of the ramp voltage at this time is sampled by the box-car filter 320 and fed to the range (R) indicator 322 on line 72. This sampling is initiated by the delayed pulse on line 64. Differentiation of this range signal by a differentiator 324 provides a signal on line 70 which is proportional to the closing velocity between the interrogator 76 and the transponder, i.e., the aircraft approach velocity, and is displayed on the range rate (R) meter 326. Range switching circuitry 328 provides a selection of range and velocity scales for the range rate (R) meter 326 and the range (R) meter 322. The interrogate signal on line 74 is also used to reset the ramp generator 277 to zero range just prior to the next measuring cycle.

Referring now to FIG. 3 which is a perspective view of the three-axis gimbal shown generally at 62 in FIG. 1. The three-axis gimbal consists of an azimuth gimbal 400, a pitch (elevation) gimbal 402, and a yaw gimbal 404. Mounted firmly on the inner (yaw) gimbal 404, is the antenna array 36, the narrow angle television camera 10, the wide angle television camera 12 and the infra-red scanner 26. The antenna array 36 comprises five dipole antenna elements, 406, 408, 410, 412, and 414 which produce signals which may be switched in such a way as to provide a coarse and/or fine tracking mode with the azimuth and elevation angle error signals. The television cameras 10, 12, the infra-red scanner 26, and the antenna array 36 are all collimated. Specifically, in the coarse track mode antenna dipole elements 408, 410 and 412 are used to perform the interferometric antenna function, and in the fine track mode dipole elements 406, 410 and 414 are utilized. This variation in element spacing is in accordance with well-known principles of the interferometer art, i.e., the ability to distinguish small angular increments increases as the separation between the antenna elements increases. The switching operation required to perform this selective enabling of the antenna elements has been described in connection with FIG. 2a. Azimuth and elevation angle information is obtained by the antenna array 36 by enabling pairs of elements in horizontal or vertical alignment. Specifically, azimuth information is obtained by enabling either of two element pairs depending upon the coarse of fine track mode. If coarse track azimuth information is required then elements 410 and 412 are enabled; if fine track azimuth information is required then 410 and 414 are enabled. Similarly, elevation angle information is obtained by enabling either of two element pairs depending upon coarse or fine track mode. When coarse track elevation angle information is desired, elements 410 and 408 are enabled, while if fine track elevation angle information is required, then 410 and 406 are enabled. The required switching logic to synchronize these switching operations has been explained in the discussion relative to FIGS. 2a and 2b.

The servo motor system, 60 of FIG. 1, is comprised in FIG. 3 of a DC torque motor 416 mounted on the inner azimuth gimbal 402, and a second DC torque motor 418 mounted on the elevation gimbal 400. The torque motors serve to position the inner gimbal 404 to the desired angular position. Control signals for the two torque motors 416 and 418 may be derived from manually operated controls located in the helicopter cockpit, or the azimuth and elevation signals on lines 48 and 50 of FIG. 1 may be used. These signals, produced by the radar angle tracking receiver 40 of FIG. 1, cause the servo system to operate in the conventional closed-loop manner.

FIG. 4 is a block diagram showing the elements of the ground-based transponder which receives signals from the airborne interrogator antenna 80 of FIG. 1. Such transponders are well-known, but is discussed herein to show the complete operation of the preferred embodiment of the present invention. A signal transmitted by the interrogator 76 in the helicopter is received by an antenna 500 and fed to a conventional type directional coupler switch 502. The received signal is then fed by line 504 to a bandpass filter 506 which removes all unwanted components from the frequency spectrum of the received signal. The filtered signal on line 508 is then mixed in a conventional mixer 510 with a signal on line 512 produced by a local oscillator 514. The mixer 510 output signal on line 516 is then fed to an intermediate frequency amplifier 518 which is functionally combined with a conventional detector circuit 520. This signal, which has been received and detected by a first IF stage, is then fed on line 522 to a decoder 524 which decodes the pulse code produced by the encoder (302 of FIG. 2b) in the airborne interrogator. This decoded signal on line 526 and the detected but not decoded signal on line 528 are gated in an AND logic device 530, which produces on line 532, a signal having one pulse for every two-pulse-code contained in the received signal. This pulsed signal on line 532 is then fed to a delay line 534 where it is delayed by a pre-set time. This delay allows the airborne angle tracking receiver and ranger, 40 and 52 of FIG. 1, to operate to zero range on relatively wide pulses. The time delayed signal on line 536 is then fed to a trigger circuit 538 which drives a modulator 540. The modulator 540 output signal on line 542 is fed to a conventional magnetron tube 544 or the like, which amplifies the signal to an adequate transmission power level. The magnetron 544 then produces the proper response signal on line 546 which is fed to the rat-race switch 502 for transmission by the antenna element 500.

It should be understood that the details of the foregoing embodiment are set forth by way of example only. A similar type of transponder might be used and various television camera arrangements are possible. Accordingly, it is contemplated that this invention not be limited by the particular details of the embodiment as shown except as defined in the appended claims.

What is claimed is:

1. A system providing information for pointing an aircraft at a selected location, comprising:
   a gimbal having three-degrees of freedom mounted aboard said aircraft,
   an interferometric antenna array mounted on said gimbal for receiving signals of a selected frequency.
   said antenna array comprising a plurality of antenna elements arranged symmetrically in a right angle pattern having horizontal and vertical legs, with the antenna elements in each leg being selectively rendered effective in order to provide both coarse and fine directional information,
   a radar receiver having inputs connected to said antenna array for producing angle signals indicating the line of sight to said selected location,
   a transmitter connected to receive said angle signals from said receiver for transmitting a pulsed signal having a selected frequency, a transponder placed at said selected location for receiving said pulsed signal from said transmitter and after a selected time delay retransmitting said pulsed signals at said selected frequency of said antenna array, servo-mechanism means mechanically connected to said gimbal and connected to receive said angle signals for driving said gimbal to point along a line of sight from said aircraft to said selected location, and indicator means located in said aircraft connected to receive said angle signals for indicating said line of sight to an operator of said aircraft.

2. The apparatus of claim 1, further comprising:
a television camera mounted on said gimbal and collimated with said antenna array for producing a video signal, and
a television display screen located in said aircraft and connected to receive said video signal for visually representing images received by said camera to said operator.

3. The apparatus of claim 2 further comprising:
an infra-red scanner mounted on said gimbal and collimated with said antenna array for producing a video signal representing infra-red radiation produced by said selected location, and
a visual display screen located in said aircraft and connected to receive said video signal representing infra-red radiation for displaying said selected location to said operator.

4. The apparatus of claim 1 further comprising:
time difference means having a first input connected to said transmitter and having a second input connected to said receiver for producing a signal representing a time difference between, the pulsed signal transmitted by said transmitter and the signals received by said antenna array at said selected frequency
a signal generator for producing an output signal having a selected frequency, and
sample and hold means having a first input connected to said signal representing a time difference and a second input connected to said output signal from said signal generator for producing a signal having a voltage level proportional to the distance between said aircraft and said transponder.

5. The apparatus of claim 1 wherein said antenna array comprises five dipole antenna elements arranged symetrically horizontally and vertically forming a right angle pattern.

6. The apparatus of claim 5 further comprising:
selectively enabled switch means having five inputs connected to said five dipole antenna elements and having two outputs connected to said radar receiver inputs for selectively connecting two of said inputs to said outputs thereby producing signals corresponding to azimuth and elevation.

7. The apparatus of claim 4 further comprising:
means for differentiating an electrical signal connected to receive said signal from said sample and hold means for producing an output signal proportional to the range rate of change, and
display means connected to receive said signal proportional to the range rate of change for indicating to said operator the rate at which said aircraft is approaching said transponder.

8. A system for providing unambiguous line of sight angle information between an aircraft and a ground based radar transponder, comprising:
a three-axis gimbal mounted aboard said aircraft,
an interferometric antenna array mounted on said gimbal for receiving signals transmitted by said transponder,
said antenna array comprising a plurality of antenna elements arranged symmetrically in a right angle pattern having horizontal and vertical legs, with the antenna elements in each leg being selectively rendered effective in order to provide both coarse and fine directional information,
a phase-lock loop receiver having inputs connected to said antenna array for producing a first detected signal and second and third angle error signals,
a range measurement unit having a first input connected to receive said detected signal and a second input for producing a first output signal indicating distance from said aircraft to said transponder and a second output signal having a fixed pulse rate,
an interrogator unit having an input connected to said signal having a fixed pulse rate for producing a signal to be transmitted to said transponder and also to be fed back to said second input of said range measurement unit,
display means located in said aircraft and connected to said first output signal from said range measurement unit for displaying range information to an operator of said aircraft, and
a servo-motor system having inputs connected to said second and third angle error signals from said phase-lock loop receiver and being mechanically connected to said gimbal for pointing said gimbal at said transponder thereby indicating to said operator the location of said transponder.

9. The system of claim 8 further comprising:
a television camera system mounted on said gimbal and collimated with said antenna array for producing video signals representing a location viewed by said television camera system, and
a television display screen located in said aircraft connected to receive said video signals for displaying said location to said operator.

10. The system of claim 9 further comprising:
a scanner sensitive only to light in the infra-red spectral region mounted on said gimbal and collimated with said antenna array for producing infra-red video signals representing a location viewed by said scanner, and
infra-red display means located in said aircraft connected to receive said infra-red video signals for displaying said location to said operator.

11. The system of claim 10 wherein said antenna array comprises:
five dipole antenna elements symetrically arranged in a right angle pattern having one leg horizontal for receiving azimuth signals and the remaining leg vertical for receiving elevation signals.

12. The system of claim 11 further comprising:
switching means having a plurality of inputs connected to said antenna array and at least two outputs connected to said inputs of said phase-lock loop receiver for selectively connecting selected ones of said dipole antenna elements to said receiver.

* * * * *